United States Patent
Marshall

[15] 3,643,178
[45] Feb. 15, 1972

[54] ELECTROMAGNETIC RADIATION BEAM DIRECTING SYSTEMS

[72] Inventor: Fred R. Marshall, Sierra Madre, Calif.
[73] Assignee: TRW Inc., Redondo Beach, Calif.
[22] Filed: Nov. 24, 1969
[21] Appl. No.: 872,458

Related U.S. Application Data

[63] Continuation of Ser. No. 343,623, Feb. 10, 1964, abandoned.

[52] U.S. Cl..............................................331/94.5, 350/160
[51] Int. Cl.................................................H01s 3/10
[58] Field of Search..............331/94.5; 250/199; 350/160

[56] References Cited

UNITED STATES PATENTS

| | | | |
|---|---|---|---|
| 3,258,717 | 6/1966 | Katzman | 331/94.5 |
| 3,344,365 | 9/1967 | Lewis | 331/94.5 |
| 3,293,565 | 12/1966 | Hardy | 331/94.5 |
| 3,516,013 | 6/1970 | Pole | 331/94.5 |

OTHER PUBLICATIONS

Pole, Conjugated—Concentric Solid State Laser System. Bull. Am. Phys. Soc., Vol. 9 (Jan. 1964) p. 66

*Primary Examiner*—William L. Sikes
*Attorney*—Daniel T. Anderson, Gerald Singer and Alfons Valukonis

[57] ABSTRACT

A dirigible beam of coherent radiation is generated by using a fixed birefringent element (Calcite plate) and a variable birefringent (Kerr cell) as a directional filter in combination with an optical resonator. The resonator is omnidirectional over a predetermined range and the directional filter is modulated to position the coherent light in any direction within said predetermined range.

6 Claims, 8 Drawing Figures

INVENTOR.
FRED R. MARSHALL
BY
ATTORNEY

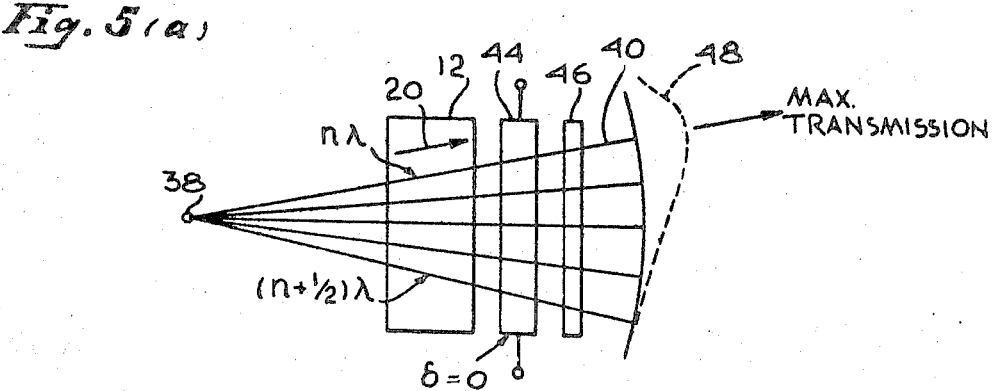
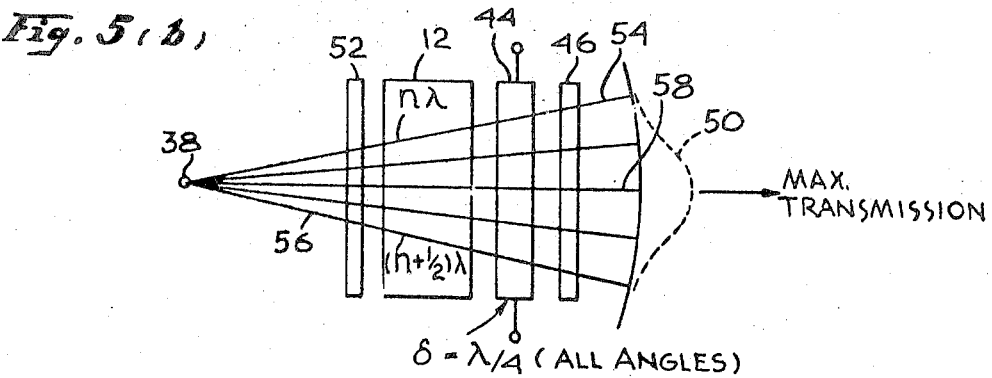
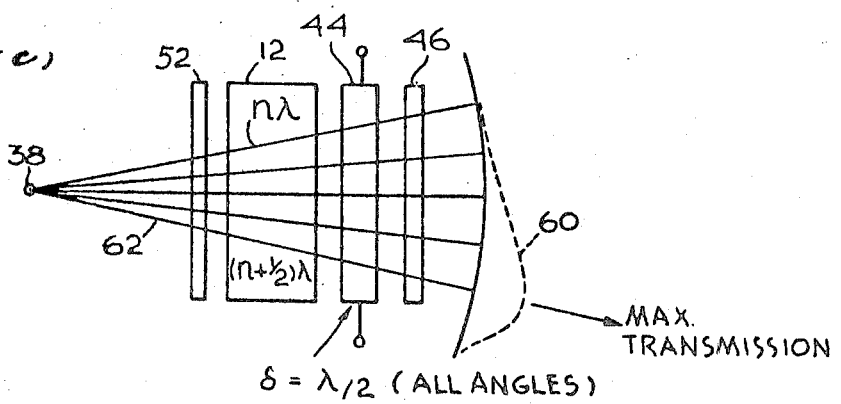

ELECTROMAGNETIC RADIATION BEAM DIRECTING SYSTEMS

This is a Streamline-Continuation of Ser. No. 343,623 filed Feb. 10, 1964 and now abandoned.

The present invention relates to systems for generating a beam of coherent electromagnetic radiation and angularly directing that beam with relatively high angular repositioning rates. More particularly, it concerns systems for generating optical or infrared coherent radiation in a system in which beam position or beam scanning is accomplished integrally and simultaneously with generation of the radiation beam.

In the prior art various types of so-called laser oscillators have been developed which operate in the optical and infrared frequency ranges. For the purposes of the present application, the expression "light frequency radiation" is intended to define the electromagnetic band from the farthest infrared to the ultraviolet and encompassing general wavelength range from about $2\times10^6$ Angstroms to about 100 Angstroms. The term "light" as used in the present application is to be understood as meaning electromagnetic radiation having substantially any wavelength within that range.

Since the advent of laser systems for generating coherent radiation, the problem of high-speed light beam deflection has become one of the great challenges of the physical sciences. The practical solution of this problem has immediate application to many technical fields such as, for example, optical radar systems, generation and control of lethal rays, information storage and readout mechanisms for computer systems, space distributed display of visual indicia, and industrial metalworking For convenience in emphasizing the advantages of the present invention, the same are hereafter discussed in connection with the application of the present invention to optical radar systems. It is, of course, to be expressly understood that the invention is contemplated as having broad application wherever angular direction of a light beam is required and its application is not restricted to the particular systems discussed hereinafter.

There is a distinct need, in the optical radar field, for apparatus which provides rapid angular scanning of the direction of a light beam. In systems where the beam generating structure is physically rotated or otherwise mechanically repositioned, the mechanical inertia of the structures and the magnitude of the angular accelerations required have presented practical limitations; that is, the desired angular repositioning rates frequently demand unrealizable driving torques and impose excessive mechanical stresses on the beam-forming structure. The foregoing practical limitations are a strong incentive for developing systems which embody electrically controllable means for angularly scanning or readjusting the direction of the generated light beam relative to the position of the physical structure which generates the beam.

In the microwave radar art, various electronically scanning antennas have been developed which depend on signal phase shifting to control the direction of the output radiation beam. In such systems the high mechanical inertia of a massive antenna structure is avoided; however, it is replaced by the mechanical inertia or the electrical inductance of the electronic phase-shifting mechanisms. Moreover, the concepts and principles used for electronic phase-shifting in microwave antenna systems are not readily applicable to laser systems for generating coherent light beams.

Accordingly, it is a primary object of the present invention to provide a system for generating a light beam which system enables preselection of substantially any desired beam direction within a predetermined angular range, and which avoids one or more of the disadvantages of the prior art systems.

It is another object of the invention to provide a coherent radiation beam producing system in which the angular direction of coherent oscillation and beam propagation is selectively determinable and controllable by electrical signal responsive means disposed within the beam forming resonant cavity.

It is a further object of the present invention to provide a coherent radiation beam producing system which achieves continuous function variation of the output beam direction by application of electrical signals to portions of the active system which generates the coherent radiation.

In a preferred form of the present invention the foregoing objects are achieved by the utilization of electrooptical elements positioned within a cavity designed to support oscillation in the light frequency range. The cavity resonator is omnidirectional over a predetermined angular range in the sense that a beamlike mode of light frequency oscillation may exist in any direction over that range. In accordance with conventional laser practice, the optical resonator includes a light amplifying means preferably in the form of a population density inversionable medium for generating light by stimulated emission of radiation. Chromium doped corundum (pink ruby) is one well-known example of such a medium. Further, in accordance with the invention, a directional filter means is positioned in operative association with the light amplifying means for determining, at any time, the direction of dominant mode oscillation within the cavity. In a preferred form, the directional filter means comprises at least one element which exhibits double refraction properties which vary as a function of applied electrical stress. More specifically, the directional filter means, in one embodiment, consists of a fixed birefringent element such as a Calcite plate together with a variable birefringent element such as a Kerr cell or a Pockels cell. The birefringent elements, operating as a directional filter, select a particular angular direction (within the angular range for which the cavity is omnidirectional) and provide maximum light amplification along that direction, so that a dominant oscillatory mode is achieved in that specific direction and optical frequency oscillation in other directions is substantially suppressed.

The manner in which the foregoing results are achieved together with other objects and features of this invention will be more apparent from the following description when taken in accordance with the accompanying drawings, throughout which like reference characters indicate like parts, which drawings form a part of this application and in which:

FIGS. 5a, 5b and 5c are diagrams illustrating the variable transmissivity of an electro-optically variable light filter.

Figure 1:
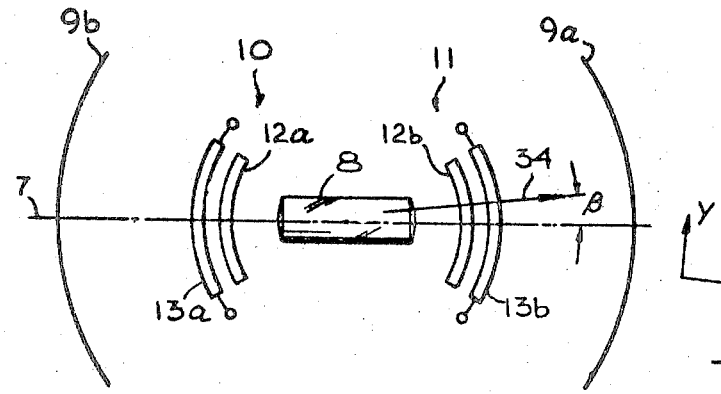
FIG. 1 is a simplified diagrammatic illustration of one embodiment of a system for generating a dirigible beam of coherent radiation in accordance with the invention.

Briefly described, the system illustrated in FIG. 1 comprises a light amplifying means (which preferably is a laser material such as a cylindrical ruby rod 8), a substantially omnidirectional light frequency resonator shown diagrammatically as consisting of a pair of concave spherical reflectors 9a and 9b, and directional filter means comprising similar assemblies 10 and 11 positioned adjacent opposite ends of the ruby rod 8 and symmetrically about the longitudinal axis of the rod 8. For simplicity of analysis the system of FIG. 1 is illustrated as utilizing a pair of identical reflector elements 9a and 9b aligned facing one another and spaced apart a distance equal to approximately twice their radius of curvature. Likewise, for analytical facility, the directional filter means 10 and 11 are shown as being identical assemblies disposed symmetrically about the center of spherical symmetry. The ruby rod 8 preferably is provided with spherically ground integral lens elements at its axial ends. Reflectors 9a and 9b are spherical about the center of ruby rod 8, and the elements 10 and 11 each comprise in a preferred form, a fixed birefringent element 12 and a variable birefringent element 13, with this latter element preferably being a Kerr effect device such as a conventional Kerr cell. Where a Kerr cell is used for the elements 13a and 13b, it may be provided with spherical lenses at its axial ends to achieve the optical effect represented by the spherical elements 13a and 13b shown in FIG. 1. Alternatively, as will be discussed in greater detail hereinafter, variable birefringent elements having planar light transmissive surfaces may be used providing that appropriate adjustment of the physical dimensions of the resonant cavity are made.

The system of FIG. 1 has spherical symmetry over an angular range corresponding to the angle subtended by the diameter of the reflecting element 9a. Accordingly, a light ray passing through the system at any angle within that range passes normal to every surface and encounters similar materials regardless of angle. Except for the effect of the directional filter assemblies 10 and 11, the system would oscillate to produce a laser beam in any direction over that angular range. That is, if the filter assemblies 10 and 11 were removed the remaining structure of the system of FIG. 1 would constitute a Fabry-Perot resonator of the general type known heretofore in the prior art and discussed, for example, by G. D. Boyd and H. Kogelnic in an article entitled "Generalized Confocal Resonator Theory" the Bell Systems Technical Journal, July 1962, pages 1347 to 1369. The resonant cavity laser system illustrated in FIG. 1 differs from that prior art principally in that, as stated heretofore, it is omnidirectional over the solid angle subtended by the diameter of the reflecting elements 9a and 9b relative to the longitudinal center of laser rod 8.

With the directional filters 10 and 11 in position as shown in FIG. 1, the system is no longer free to oscillate in any direction. Rather, the birefringent characteristics of the elements 12 and 13 govern the angular direction along which oscillation is permitted at any particular time. The precise concepts which enable the filter assemblies 10 and 11 to variably control the output beam direction will be considered in more particular hereinafter. For the present, it is enough to note that a beamlike mode of oscillation is possible in any direction over a substantial angular range and that by application of variable electrical control signals to the birefringent elements 13a and 13b, the system may be caused to have a preferred direction of multiple reflection light frequency oscillation, with the preferred direction varying angularly as a function of the applied control signal magnitude. It should be noted that the variable filter assemblies 10 and 11, as thus far described, would be operative to vary the preferred direction of oscillation in one plane only. That alone is a useful function since it enables generation of a beam which may be angularly scanned in a single plane. However, in the preferred form of the present invention, angular scanning throughout the solid angle of omnidirectionality is achieved by rotating the filter assembly 10° through 90° around the longitudinal axis 7 of the system. With this alternative arrangement, the second directional filter assembly 11 operates to vary the direction of maximum transmission angularly in the plane of FIG. 1, and the orthogonally positioned directional filter assembly 11 operates to vary the direction of maximum transmission in the central plane normal to FIG. 1, so that the system may support an oscillatory mode with the end spots of the multiply reflected light beam being selectively located at one elemental portion of the reflector 9b and at a diametrically opposite elementary portion of the reflector 9a.

Figure 2:
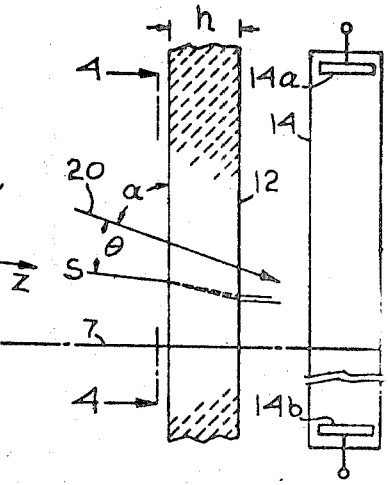
FIG. 2 is an enlarged cross-sectional illustration of one exemplary arrangement for providing directional filtering in systems such as that of FIG. 1.

For a full and complete understanding of the manner in which the described system achieves directional filtering and beam steering in response to electrical control signals it is perhaps desirable to consider in some detail the optical phenomenon of birefringence (double refraction) as it applies to systems in accordance with the invention. To that end, there is shown diagrammatically in FIG. 2 an enlarged cross-sectional view of the directional filter assembly 11 of FIG. 1. In FIG. 2, the reference numeral 12 indicates a calcite plate corresponding to the fixed birefringent element 12b of the system of FIG. 1. Optically and operatively associated with plate 12 is a variable birefringer 14, illustrated as being a Kerr cell having plates 14a and 14b to which an electrical control signal may be applied for producing an electrical field in the nitrobenzene with which the Kerr cell is filled. Reference numeral 7 designates the longitudinal axis or axis of symmetry corresponding to the central axis 7 of the system illustrated in FIG. 1, with the Calcite plate 12 and the variable birefringer 14 being substantially normal to the axis 7. Line 20 indicates the direction of the optic axis of the Calcite plate 12 relative to its planar surfaces. It is important to note that the Calcite plate 12 is not a basal section as commonly used in optical instruments. Rather the optic axis makes an arbitrary angle relative to the planar surfaces of the Calcite plate 12.

For analytical convenience, let us assume that the optic axis 20 is in the plane of the paper. Also, let us select arbitrarily a ray direction or wave normal S which passes through the plate 12 antiparallel to the central axis 7 and antiparallel relative to the optic axis 20. Again for convenience, let us assume that the wave normal S is in the plane of the paper and intercepts the optic axis 20 at an arbitrary angle $\theta$. With these assumptions, the plane of FIG. 2 necessarily is the 'principal section' of the crystal 12 for the particular wave normal S. Further for analytical convenience, we may establish coordinate axes X, Y and Z such that wave normal S lies along the Z-axis, the Y-axis lies in the plane of the paper (and hence in the principal section), and the X-axis is normal to the plane of the figure.

Having established the foregoing conditions and axes, the Calcite plate 12 conforms to classical optic analysis as set forth in detail in Born and Wolf "Principles of Optics," Pergamon Press, New York, (1959) Library of Congress, Card Number 58–12496. Specifically, Born and Wolf at pages 675 to 697 teach that for a crystal section such as the plate 12 in FIG. 2, Fresnel's equation of wave normals reduces to a quadratic having two roots $v_p'$ and $v_p''$ which are given $$v_p'^2 = v_o^2 \tag{1a}$$
$$v_p''^2 \text{ is } v_o^2 \cos^2\theta + v_e^2 \sin^2\theta \tag{1b}$$

Equations (1) have an important significance. Equation (1a) shows that one surface shell of the wave normals is a sphere of radius $v_p' = v_o$. Thus, one of the two waves transmitted by the birefringent plate 12 and corresponding to any particular wave normal direction $-\theta$ is an ordinary wave having a propagation velocity independent of the direction of propagation of the ray represented by wave normal S.

Similarly, equation (1b) signifies that the other surface of wave normals is a fourth order surface of revolution (i.e., an ovaloid). Accordingly, this second one of the two waves, commonly referred to as the extraordinary wave, has a propagation velocity which varies as a function of the angle $\theta$ subtended between wave normal S and optic axis 20.

It can be shown that the electric vector $E_o$ of the ordinary wave vibrates normal to the principal plane of the crystal 12 and that the electric vector $E_e$ of the extraordinary wave vibrates in the principal plane (i.e., in the plane of the paper of FIG. 2).

Before proceeding further, it is desirable to consider briefly the polarization characteristics of the coherent light emitted by laser elements such as the ruby rod 8 of FIG. 1. It is well known in the art that pink ruby of the type commonly used for lasers is an optically anisotropic material having a cross section $\sigma$ for absorption which varies as a function of the polarization of the impinging radiation. That is, a plane polarized ray passing through the ruby rod 8 at one specific polarization angle relative to the crystal structure will encounter a maximum absorption characteristic, and a plane polarized wave travelling in the same direction but polarized at a different angle will encounter a minimum absorption. Similarly, it is well known[1] ([1]See for example, a paper entitled "The Polarization of the Output From a Ruby Optical Maser" read by D. F. Nelson and R. J. Collins, at the Second International Conference on Quantum Electronics, Berkeley, March 1961, and reported in "Advances in Quantum Electronics," edited by J. R. Singer, Columbia University Press, New York, 1961) that a pumped or population inverted ruby will have a minimum amplification or gain for plane polarized waves having a first angular orientation and a maximum gain for a second orientation. In a practical apparatus such as that illustrated in FIG. 1, the foregoing gain-versus-polarization characteristic means that the ruby rod 8 tends to produce a dominant oscillatory wave which is plane polarized in the "-preferred" (i.e., maximum gain) plane of the crystal structure of the ruby. Thus, if we assume oscillation between the reflectors 9a and 9b and along the central axis of the ruby 8, it is evident that the ruby may be rotated about its longitudinal axis to orient the plane of polarization of the generated radiation to any desired angle.

Figure 3:
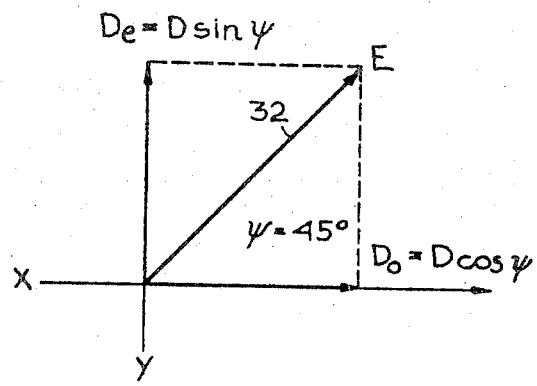
FIGS. 3 and 4 are vector diagrams useful for explaining the principles of operation of the arrangement illustrated in FIG. 2.
Figure 4:
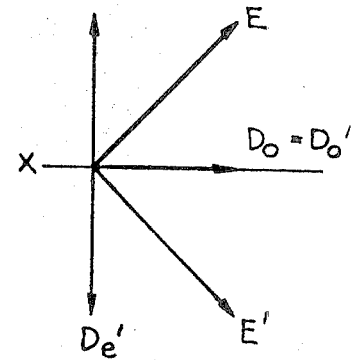

Accordingly, let us assume that ruby rod 8 is rotated to position the plane of polarization of the generated wave at a 45° angle relative to the plane of FIG. 1. Now, referring to FIGS. 2 and 3, let us consider that the ray represented by wave normal S is plane polarized as mentioned above so that the E-field vector 32 vibrates in a direction at 45° with respect to the X- and Y-axes. FIGS. 3 and 4 may be considered as cross-sectional views taken along the lines 4—4 of FIG. 2 and normal to the Z-axis. The electric vector 32 in FIG. 3 can be considered as being comprised of two components $E_e = E \sin \psi$ and $E_o = E \cos \psi$. Since these two components vibrate in the Y-axis and X-axis directions respectively, it is clear that $E_o$ is the electric vector of the extraordinary wave in the crystal 12 and $E_e$ is the electric vector of the extraordinary wave. In passing through the crystal plate 12 the propagation velocity of the ordinary wave $v_p' = v_o$ is completely independent of the angle $\theta$. In contrast, the propagation velocity or phase velocity $v_p''$ of the extraordinary wave is different from that of the ordinary wave (smaller for positive uniaxial crystals such as quartz and Calcite) and varies as a function of the angle $\theta$ as specified by equation (1b). It is well known (Born and Wolf, Sections 14.4.3 and 14.4.4) that when a ray S passes through a uniaxial crystal such as plate 12 the phase difference of the two components $E_o$ and $E_e$ upon emerging is $$\delta = BL/\lambda = 2\pi\rho/\lambda \, (n_e - n_o) \sin_2\theta \tag{3}$$

Where

B is the difference of the refractive indexes for the particular direction of propagation, L is the average optical path length of the ray in question, λ is the wave length in air, δ is the resulting phase difference between the two components (i.e., the phase retardation of $E_e$ relative to $E_o$), $n_o$ and $n_e$ are the refractive indexes of the particular crystal material for the ordinary wave and the extraordinary wave respectively, ρ is the polar distance physical path length of the ray in passing through the crystal plate 12, and $\theta$ is the angle which the wave normal S subtends relative to the optic axis 20 in passing through the crystal.

Equation 3 specifies, inter alia that the extraordinary wave electric vector $E_e$ is retarded to a greater or less extent depending on the angle $\theta$. Now, considering the apparatus of FIG. 1 it is clear that spontaneously emitted rays may be propagated from the ruby rod 8 in substantially any direction. Thus, it is appropriate to consider waves passing through the birefringent element 12b with different directions of propagation, and in FIG. 2, we must consider rays which pass through the plate 12 at varying angles $\theta$ relative to the optic axis 20. When the angle $\theta$ is such that equation (3) gives a value for the phase retardation δ of π/2 the effect of the crystal plate 12 is to convert the plane polarized wave S into a circularly polarized wave.

When the angle $\theta$ is such that equation (3) gives δ equal to π radians then the emerging wave simply has the vector $E_e$ rotated through 180° (i.e., to the position illustrated by $E_e'$ in FIG. 4). Accordingly, the emerging wave, comprised of components $E_o'$ and $E_e'$ is a plane polarized wave E' which has been rotated through 90°.

By a similar process of analysis, it can be shown that as the ray direction relative to the crystal plate 12 varies, the phase difference between the components $E_o$ and $E_e$ varies 2 in accordance with the sinfunction expressed by equation (3).

Now returning to consideration of FIG. 1, it is clear from the previous discussion that a ray having a particular angular direction β relative to the central axis 7 of the system and therefore an angle $\theta$ relative to the optic axis of the fixed birefringent element 12b will have its extraordinary wave electric vector $E_e$ retarded relative to vector $E_o$ by a phase difference δ which varies as a function of the angle $\theta$. Also, it is to be remembered that ruby rod 8 will provide maximum amplification for those rays which repeatedly traverse the ruby with a direction of polarization coinciding with its "preferred" plane as discussed heretofore. Now, assuming that the ray 34, spontaneously emitted by the ruby 8, is plane polarized in the "-preferred" plane of the ruby and therefore at a 45° angle relative to the X- and Y-axes as shown in FIG. 3, it is evident that when the fixed birefringent plate 12 provides a phase difference δ=π the wave 34 emerges from the right-hand side of the plate 12 with the vector $E_e$ retarded one-half wavelength relative to the vector $E_o$. The ray 34 continues outwardly to the right and is reflected from reflector 9a and retraverses the system along precisely the same path. Upon retraversing the fixed birefringent plate 12b the returning ray suffers a further one-half wavelength retardation of the extraordinary vector $E_e$. Accordingly, upon retraversing the fixed birefringent element 12b the wave is reconverted to plane polarized light which is polarized in the same direction as the original spontaneously emitted ray 34. This wave, passing repetitively through the ruby rod 8 with the preferred angle of polarization, will be maximumly amplified and the system of FIG. 1 produces an output beam along the direction indicated by the line 34 in FIG. 1. From the foregoing it is evident that a ray which is emitted spontaneously at a slightly different angle will receive a different degree of phase retardation from the birefringent element 12b. Accordingly, the wave after passing from left to right through the birefringent element 12b being reflected from mirror 9a and retraversing the birefringent element 12b will be elliptically polarized or partially elliptically polarized so that it will not receive maximum gain from the ruby 8. Thus an embryonic oscillation along this second supposed wave direction will be suppressed or discriminated against in favor of oscillation along the ray direction 34.

The foregoing analysis has considered the manner in which the birefringent element 12b operates to select a preferred beam angle β in the plane of FIG. 1. By a similar analysis, it can be readily demonstrated that the other directional filter 10 operates to select the angle in the orthogonal plane at which the dominant oscillatory mode occurs.

Further in the foregoing analysis, the variable birefringent elements 13a and 13b have been neglected. The variable birefringer 13b, which may take the form of a Kerr cell 14 as shown in FIG. 2, simply operates in response to a varying electrical control signal to increase or decrease the amount of phase retardation provided by the fixed birefringer 12b for a given wave direction. Stated differently, energization of the variable birefringent element 13b operates to increase the birefringent characteristic of the nitrobenzene and thereby increases the total effective difference of the refractive indexes $n_3 - n_o$ for a particular direction of propagation. To maintain maximum gain for a particular direction β, the phase retardation δ provided for that direction by the filter assembly 11 must be held to a value of δ=π radians. By considering equation (3), it is evident that if the quantity $n_e - n_o$ is increased then angle $\theta$ must decrease in order to keep the phase retardation δ constant. Accordingly, equation (3) as applied to the system of FIG. 1 specifies that the angle $\theta$ along which uninhibited oscillation will occur varies as a function of the energization of the Kerr cell variable birefringent element 13b.

Electro-optical variation of the directional properties of a directional filter is illustrated in the sequence of diagrammatic illustrations 5a, 5b and 5c. As shown in FIG. 5a a plane polarized wave is indicated as originating at a point 38 representative of any point of spontaneous emission in the ruby rod 8 of the system of FIG. 1. This plane polarized wave passes through the fixed birefringer plate 12 and suffers a phase retardation of its extraordinary component which varies as a function of the angle between the ray and the optic axis 20 of the plate 12. One particular ray 40 passes through the plate 12 parallel to the optic axis 20 and therefore the plate 12 appears isotropic to this particular ray. That is, in accordance with equation (3), the angle $\theta$ is zero and the particular ray 40 suffers no relative phase retardation in passing through the plate 12. With the variable birefringer 44 deenergized so that it has a phase retardation equal to zero the particular ray 40 passes through the directional filter without any alteration of its polarization. Accordingly, when an analyzer 46 is positioned across the light path (and rotationally oriented so that its optic axis parallel to the direction of polarization of the original wave originating from point 38) the analyzer 46 will have 100 percent transmissivity for waves propagated in the direction indicated by the ray 40. Any ray having a different wave direction will be partially attenuated by the analyzer 46 due to the fact that it passes through the plate 12 antiparallel to the optic axis 20 and suffers a phase retardation so that it is elliptically polarized when arriving at the analyzer 46. Thus the directional filter assembly illustrated diagrammatically in FIG. 5a has a transmissivity which varies as a function of incident ray angle in the manner specified by equation (3) and graphically indicated by line 48 in FIG. 5a.

FIG. 5b illustrates a similar diagrammatic arrangement comprising a fixed birefringer 12, an electro-optically variable birefringer 44 and an analyzer 46. This illustrative directional filter differs from that of FIG. 5a in that it includes an initial polarizer 52 such as a Nicol or Glan prism positioned between the light source point 38 and the birefringer 12. The purpose of providing the polarizer 52 is to demonstrate that the light emitting from point 38 need not be derived from a medium which has inherent polarizing characteristics such as the ruby rod 8 of FIG. 1. Here the light emitting from point 38 is assumed to be polarized. Polarizer 52 operates to reject all wave components except those which are polarized in a particular direction, say, for example, a polarization direction such that the electric vector vibrates in the direction of the plane of FIG. 5b. The now polarized wave passing from polarizer 52 and through the birefringer 12 suffers a phase retardation (or elliptical polarization) dependent upon the angle which a particular ray makes relative to the optic axis of the birefringer 12. Let us assume for example that a ray in the direction indicated by line 54 suffers a phase retardation of $n$ wavelengths (i.e., $n\lambda$ radians), that a ray having the direction indicated by line 56 suffers a phase retardation of $(n+\frac{1}{2}) \lambda$ radians, and that all rays between the lines 54 and 56 suffer intermediate amounts of phase retardation. Specifically, a ray having the horizontal direction indicated by line 58 is phase retarded by $(n+\frac{1}{4}) \lambda$ radians. Now, if the electro-optically variable birefringer element 44 is energized with a voltage sufficient to provide a phase retardation of one-fourth wavelength for rays having any and all directions, it is evident that a ray propagated in the direction indicated by line 58 will be phase retarded by exactly $\pi$ radians, and providing that the analyzer 46 and polarizer 52 are oriented orthogonally (i.e., crossed-polarizers) this particular wave passes through the analyzer 46 without being attenuated. In contrast, a wave having the direction indicated by line 54 suffers a phase retardation $\delta=(n+\frac{1}{4})\lambda$ in passing through the elements 12 and 44 and is therefore elliptically polarized upon arriving at the analyzer 46 so that it is appreciably attenuated thereby. Curve 50 indicates the transmissivity-versus-direction characteristic of the arrangement of FIG. 5b when the electro-optically variable birefringer 44 has a phase retardation of one-fourth wavelength.

FIG. 5c illustrates an arrangement identical to that of FIG. 5b but with the electro-optically variable birefringer 44 being energized to provide a phase retardation of one-half wavelength for all directions of wave propagation therethrough. By the same process of analysis as set forth above with reference to FIG. 5b it may be demonstrated that the arrangement of FIG. 5c has a transmission characteristic as indicated by the curve 60 with the direction of maximum transmissivity being that indicated by ray 62.

In summary, FIGS. 5a, 5b and 5c illustrate that the combination of a birefringent plate 12 and an electro-optically variable birefringent element 44 such as a Kerr cell or Pockels cell may be operated as a means for variably filtering or attenuating light as a function of ray direction. When that combination of elements is disposed in a substantially omnidirectional resonant cavity in conjunction with an amplifying medium (such as a laser rod) the directional light filter means inhibits laser oscillation from occurring in any direction except one specific direction determined by the contemporaneous value of the time variable electrical bias applied to the variable directional filter means.

Figure 6:
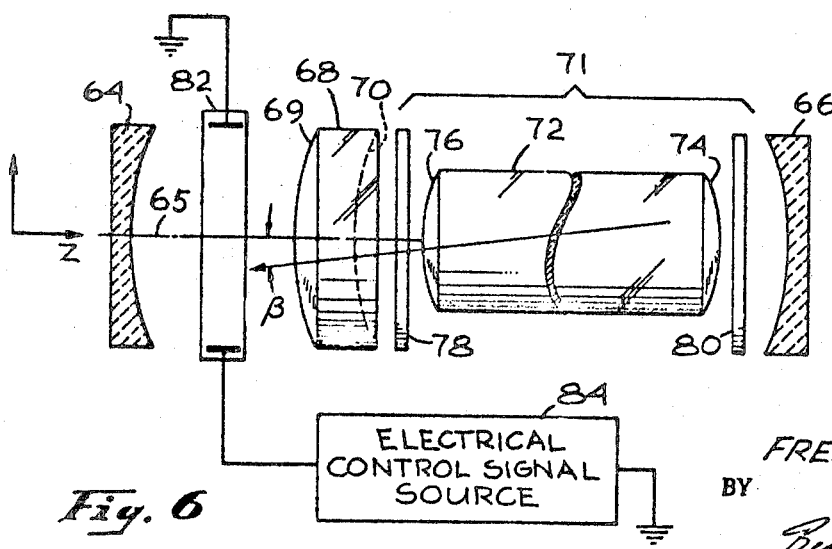
FIG. 6 is a cross-sectional view of a portion of a modified beam directing system in accordance with the invention.

In FIG. 6 there is illustrated a further embodiment in accordance with the present invention in which the various elements are depicted more structurally and in which substantially any laser material or means for amplification of light by stimulated emission may be used. FIG. 6 may be considered as a cross-sectional view taken along the axis of a system which is cylindrically symmetrical about the central axis 65. As shown in FIG. 6, a resonant cavity which is omnidirectional over a substantially angular range is formed by a pair of reflectors 64 an 66 having concave reflecting surfaces aligned facing one another from opposite ends of the axis 65. Intermediate the reflector 64 and the reflector 66 is positioned a conventional Kerr cell 82 which serves as an electro-optically variable birefringer, a fixed birefringent plate 68 having spherically convex and concave surfaces 69 and 70 ground in opposite sides thereof, and a laser element 72 having convex spherical lens elements 74 and 76 on opposite ends thereof. A source 84 of beam direction control signals is connected to applying a varying bias potential across the plates of the Kerr cell. The source 84 may for example comprise a sawtooth generator or a source of intelligence signals. The laser element 72 of the apparatus of FIG. 6 may comprise substantially any solid medium which is capable of being pumped to a condition of population density inversion between a pair of energy levels and which exhibits amplification of light by stimulated emission of the upper energy level atoms. Specifically, it is contemplated that the laser element 72 alternatively can be formed of substantially any one of the following materials LiF doped with uranium,
CaF doped with uranium,
BaF$_2$ doped with uranium,
CaF$_2$ doped with Samarium,
CaWO$_4$ doped with neodymium,
Barium crown glass doped with neodymium,
CaWO$_4$ doped with Ho$^{+3}$,
CaWO$_3$ doped with Tm$^{+3}$, or
SrF$_2$ doped with Samarium.

Moreover, it should be understood that the system of FIG. 6 is not limited to the use of the foregoing or other solid-state laser materials now known to persons skilled in the art, but may, if desired, comprise the now well-known helium-neon gas emission lasing medium enclosed in a cylindrical dielectric tube and fitted with separate lens elements 74 and 76 at its opposite ends.

It will be appreciated that most gas lasers and many of the above-mentioned solid-state lasing materials are isotropic in the sense that they do not inherently produce polarization of the output beam which they generate under normal circumstances. As discussed heretofore, operation of the birefringent elements 68 and 72 as a directional filter require that the light arriving at these elements be plane polarized and that the amplifying means with which they are associated have a preferred plane of polarization for which it provides a maximum amplifying effect. To that end, the amplifying means 71 of the apparatus of FIG. 6 comprises, in addition to the isotropic laser element 72, a pair of parallel oriented polarizers 78 and 80 disposed respectively adjacent opposite ends of the laser element 72. The polarizing elements 78 and 80 may be substantially any of the various polarizers which are well known in the optical arts, such as for example a Glan prism of the type which is now commonly used in so-called "Giant-pulse" laser systems or a quartz Wallaston prism. The operation of the apparatus of FIG. 6 is substantially the same as described heretofore in connection with the system of FIG. 1 and particularly as described in connection with FIGS. 5b and 5c where the polarizer 52 was used to plane polarize the initially impinging radiation. Accordingly, it is not necessary to further belabor the operation of the system of FIG. 6.

While the systems in accordance with the present invention have been described as incorporating Kerr cells as the electro-optically variable birefringent elements it should be understood that the invention is not so restricted. Rather, substantially any device or material which exhibits variable birefringence as a function of an applied electrical or other control signal may be used for the elements 13a, 13b of FIG. 1 and variable element 82 of FIG. 6. It is contemplated that quartz crystals may be used for these electro-optically variable elements. In such a case the electro-optic response is proportional to the dimension in the Z-axis direction of the crystal, which is the direction of light travel, and to the transverse electrostatic gradiant. Other known crystaline materials exhibiting an electro-optic response to fields applied transversely to the direction of light travel may be used. Various alternative electro-optical materials which will be recognized as readily applicable to the systems of the present invention are disclosed for example in U.S. Pats. No. 2,811,898 issued Nov. 5, 1957 and No. 2,766,659 issued Oct. 16, 1956.

Further, while the apparatus of FIG. 6 has been illustrated for simplicity and clarity as comprising a single-directional filter 71 it will be appreciated that beam direction control in the orthogonal plane is likewise intended and is readily achievable in accordance with the invention by providing a second identical directional filter (not shown), which is to be rotationally oriented orthogonally relative to the illustrated filter 71. This concept has been discussed in more detail heretofore in connection with the apparatus of FIG. 1, and therefore need not be described again, it being understood that features of the apparatus of FIG. 1 may be incorporated in the system of FIG. 6, and vice versa within the teachings and scope of the invention.

While the present invention has been shown in certain specific embodiments only, it will be obvious to those skilled in the art that it is not so limited but is susceptible of various changes and modifications without departing from the spirit and scope of the concepts thereof.

What is claimed is:

1. In a system for generating an angularly dirigible light beam;
    an optical frequency resonant cavity having a predetermined axis and capable of supporting a beamlike mode of optical frequency oscillation in any selected beam direction within a predetermined solid angle around said axis;
    said cavity comprising first and second substantially spherical concave reflecting surfaces aligned facing one another at opposite ends of said axis and spaced apart a distance approximately equal to the sum of their radii of curvature;
    amplifying means including a population density inversionable medium for amplification of light by stimulated emission of radiation, said amplifying means being disposed between said first and second reflecting surfaces in a manner such that light obtained in the cavity is repetitively reflected through said amplifying means;
    said amplifying means having a relatively high amplification factor for through-passing light which is linearly polarized in a predetermined transverse direction and a relatively low amplification factor for otherwise polarized light;
    directional filter means for variably and selectively controlling the angle with respect to said axis of cooperative stimulated emission and optical frequency oscillation in said cavity;
    said filter means being positioned in said cavity in a manner such that light rays within said predetermined angular range are transmitted serially through said filter means and said amplifying means;
    with said filter means comprising at least one electro-optically variable birefringent element which alters the polarization of light passing therethrough as functions of (1) the angular direction of the particular light ray relative to said axis, and (2) the magnitude of an electrical control signal applied to said element, so that for any selected ray direction said birefringent element having an optical axis, and said birefringent element being oriented relative to said reflecting surfaces, so that said optic axis subtends a relatively small acute angle with respect to said predetermined axis, said amplifying means and said filter means cooperatively exhibit an amplification factor for optical frequency oscillation which varies as a function of said control signal; and
    means to apply electrical control signals to said element for selectively varying the angle with respect to said axis of the dominant oscillatory mode within said cavity in accordance with a predetermined time-function.

2. A system in accordance with claim 1 in which said variable birefringent element comprises a calcite plate having a fixed birefringency and an adjacently disposed Kerr cell having a degree of birefringence which varies as a function of applied control potential, thereby to vary the angle of the light beam with respect to said predetermined axis.

3. A system in accordance with claim 1 in which said amplifying means comprises an elongated chromium doped $Al_2O_3$ crystal exhibiting a degree of dichroism sufficient to normally produce plane polarization of light generated by stimulated emission of radiation therein.

4. A system in accordance with claim 1 in which said amplifying means includes a pair of parallel oriented polarizers positioned substantially normal to the system axis at opposite ends of said population inversionable medium.

5. An optical or infrared laser system comprising:
    a radiation path bounded at its ends by means including a pair of reflecting elements for substantially omnidirectional optical frequency resonance;
    light amplifying means including an active medium having a crystal lattice molecular structure and characterized by at least two distinct energy levels having an energy separation corresponding to a frequency within the optical frequency range of interest, and further characterized by dichroism such that light rays passing therethrough are amplified as a function of the angular orientation of the crystal lattice of said medium relative to the direction of vibration of the electric field vector of the light rays;
    doubly refracting means located between said amplifying means and at least one of said reflecting elements in a position such that substantially all light rays obtained within the cavity which have a direction conducive to multiple reflection oscillation between said reflecting elements are obliged to pass through the doubly refracting means, and with an orientation relative to said reflecting elements such that an optic axis of the doubly refracting means subtends a relatively small acute angle with respect to every possible multiple reflection oscillation direction between said reflecting elements;
    means for applying continuously variable magnitudes of electrical stress to said doubly refracting means over a predetermined range of stress magnitudes;
    said doubly refracting means exhibiting double refraction properties which vary as a function of applied electrical stress with the double refraction vs stress characteristic thereof being such that for each different incremental stress magnitude within said range there is a single angularly different multiple reflection direction with respect to an axis of said active medium for which the doubly refracting means is operative to repetitively transmit through said amplifying means a plane polarized light wave having its direction of electric field vibration oriented for optimum amplification by said amplifying means.

6. An optical or infrared laser system comprising:

a radiation path bounded at its ends by means including a pair of reflecting elements for substantially omnidirectional optical frequency resonance;

light amplifying means including an active medium having a crystal lattice molecular structure and characterized by dichroism such that light rays passing therethrough are amplified as a function of the angular orientation of the crystal lattice of said medium relative to the direction of vibration of the electric field vector of the light rays, doubly refracting means between said amplifying means and at least one of said reflecting elements in a position such that substantially all light rays obtained within the cavity which have an angular direction with respect to said active medium conducive to multiple reflection oscillation between said reflecting elements are obliged to pass through the doubly refracting means; and with an orientation relative to said reflecting elements such that an optic axis of the doubly refracting means subtends a relatively small acute angle with respect to every possible multiple reflection oscillation direction between said reflecting elements; and means for applying continuously variable magnitudes of electrical stress to said doubly refracting means over a predetermined range of stress magnitudes;

said doubly refracting means exhibiting double refraction properties which vary as a function of applied electrical stress with the double refraction vs. stress characteristic thereof being such that for each different incremental stress magnitude within said range there is a single angularly different multiple reflection direction for which the doubly refracting means is operative to repetitively transmit through said amplifying means and said active medium a plane polarized light wave having its direction of electric field vibration oriented for optimum amplification by said amplifying means.

* * * * *